United States Patent
Huang et al.

(10) Patent No.: US 8,531,810 B2
(45) Date of Patent: Sep. 10, 2013

(54) OVER-CURRENT PROTECTION CIRCUIT AND ELECTRONIC DEVICE WITH THE SAME

(75) Inventors: Ren-Wen Huang, Shenzhen (CN); Qiang You, Shenzhen (CN); Tsung-Jen Chuang, New Taipei (TW); Shih-Fang Wong, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 74 days.

(21) Appl. No.: 13/221,920

(22) Filed: Aug. 31, 2011

(65) Prior Publication Data

US 2012/0293902 A1 Nov. 22, 2012

(30) Foreign Application Priority Data

May 17, 2011 (CN) .......................... 2011 1 0127060

(51) Int. Cl.
*H02H 3/08* (2006.01)
(52) U.S. Cl.
USPC ........................................................ 361/93.7
(58) Field of Classification Search
USPC ........................................................ 361/93.7
See application file for complete search history.

(56) References Cited

U.S. PATENT DOCUMENTS 3,703,679 A * 11/1972 Heidt ............................. 323/278
5,383,082 A * 1/1995 Nishizawa .................... 361/93.1

FOREIGN PATENT DOCUMENTS

JP 2000175345 * 6/2000

* cited by examiner

*Primary Examiner* — Jared Fureman
*Assistant Examiner* — Kevin J Comber
(74) *Attorney, Agent, or Firm* — Altis Law Group, Inc.

(57) ABSTRACT

An over-current protection circuit for preventing a function module from over-current, the function module obtains power from a power source via an input port. The over-current protection circuit includes a path switch, a current detection circuit, a conductor switch, a first control module, and a second control module. The current detection circuit and the path switch form a loop with the input port and the function module. The current detection circuit detects a value of a current of the loop, and produces a first control signal when detecting the current of the loop is equal to or greater than a predetermined current value. The first control module turns off the conductor switch when receiving the first control signal. The second control module turns off the path switch when the conductor switch is turned off, thereby cutting off the loop.

9 Claims, 2 Drawing Sheets

OVER-CURRENT PROTECTION CIRCUIT AND ELECTRONIC DEVICE WITH THE SAME

BACKGROUND

1. Technical Field

The present disclosure relates to protection circuits and, particularly, to an over-current protection circuit.

2. Description of Related Art

Electronic devices (e.g., mobile phones, media players) are becoming more and more popular. The working current of these electronic devices needs to be below a predetermined value, if the working current exceeds the predetermined value, the electronic devices would be damaged. So, it is needed to monitor the working current of the electronic devices and protect the electronic devices when the working current exceeds a predetermined value. Generally, many electronic devices adopt a particular chip to execute the over-current protection function, however, the chip is expensive, thus increasing the manufacturing cost.

Therefore, it is desirable to provide an over-current protection circuit to overcome the described limitations.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail, with reference to the accompanying drawings.

Figure 1:
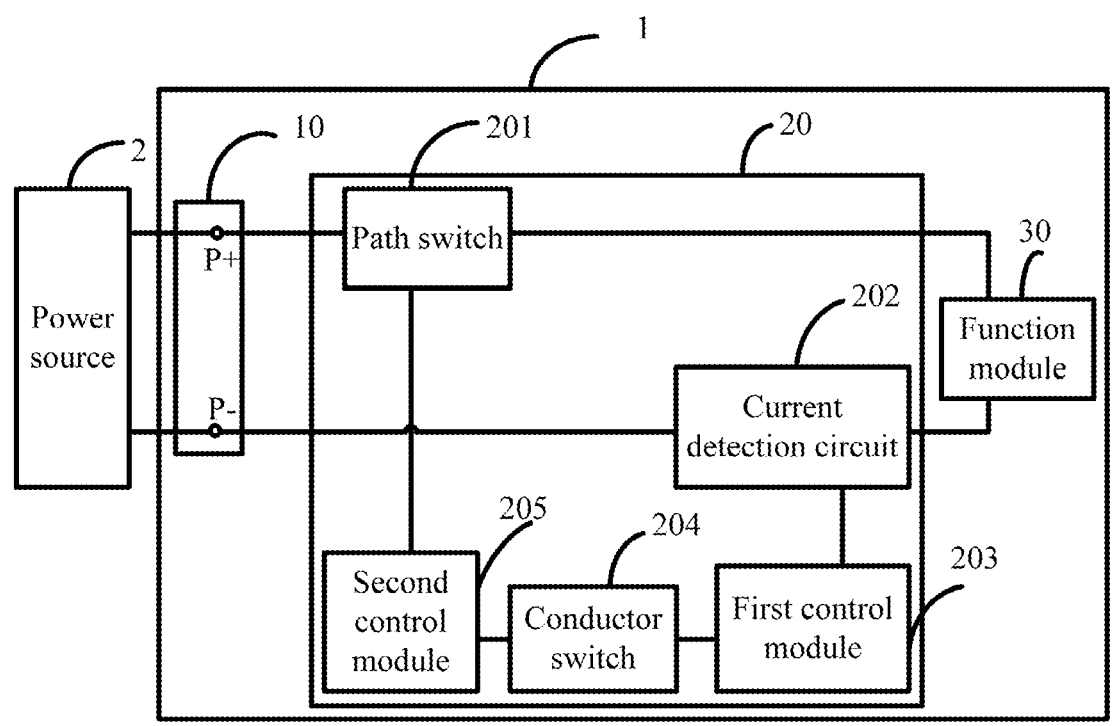
FIG. 1 is a block diagram of an electronic device with an over-current protection circuit, in accordance with an exemplary embodiment.

Referring to FIG. 1, an electronic device 1 includes an input port 10, an over-current protection circuit 20, and a function module 30. The input port 10 connects to a power source 2 and receives power from the power source 2. The over-current protection circuit 20 is connected between the input port 10 and the function module 30, and detects the current value of the function module 30. When the current value of the function module 30 is less than a predetermined current value, the over-current protection circuit 20 continues the connection between the input port 10 and the function module 30. When the current value of the function module 30 is equal to or greater than the predetermined current value, the over-current protection circuit 20 discontinues the connection between the input 10 and the function module 30.

The over-current protection circuit 20 includes a path switch 201, a current detection module 202, a first control module 203, a conductor switch 204, and a second control module 205. In the embodiment, the input port 10 is electrically connected to the function module 30 and forms a loop, and the current of the loop is that of the function module 30, the path switch 201 and the current detection module 202 are located in the loop formed by the input port 10 and the function module 30. That is, the current detection circuit 202 and the path switch 201 forming the loop with the input port 10 and the function module 30. The current detection circuit 202 detects the current value of the loop, and outputs a first control signal to the first control module 203 when detecting the current value of the loop is equal to or greater than the predetermined current value. The first control module 203 turns off the conductor switch 204 when receiving the first control signal. The second control module 205 turns off the path switch 201 when the conductor switch 204 is turned off, discontinuing the connection between the input port 10 and the function module 30.

When the current detection circuit 202 detects the current of the loop is less than the predetermined current value, the current detection circuit 202 outputs a second control signal to the first control module 203. The first control module 203 turns on the conductor switch 204 when receiving the second control signal. The second control module 205 turns on the path switch 201 when the conductor switch 204 is turned on, continuing the connection between the input port 10 and the function module 30.

In one embodiment, the electronic device 1 can be a mobile phone, a digital camera, or a digital photo frame, for example. The power source 2 can be a built-in battery or an AC to DC (Alternating current to direct current) rectifier. The function module 30 includes necessary function components such as processing unit, communication unit. In other embodiments, the electronic device 1 can be a landline phone or a modem, which should connect to an exchanger, and obtain power from the exchanger.

Figure 2:
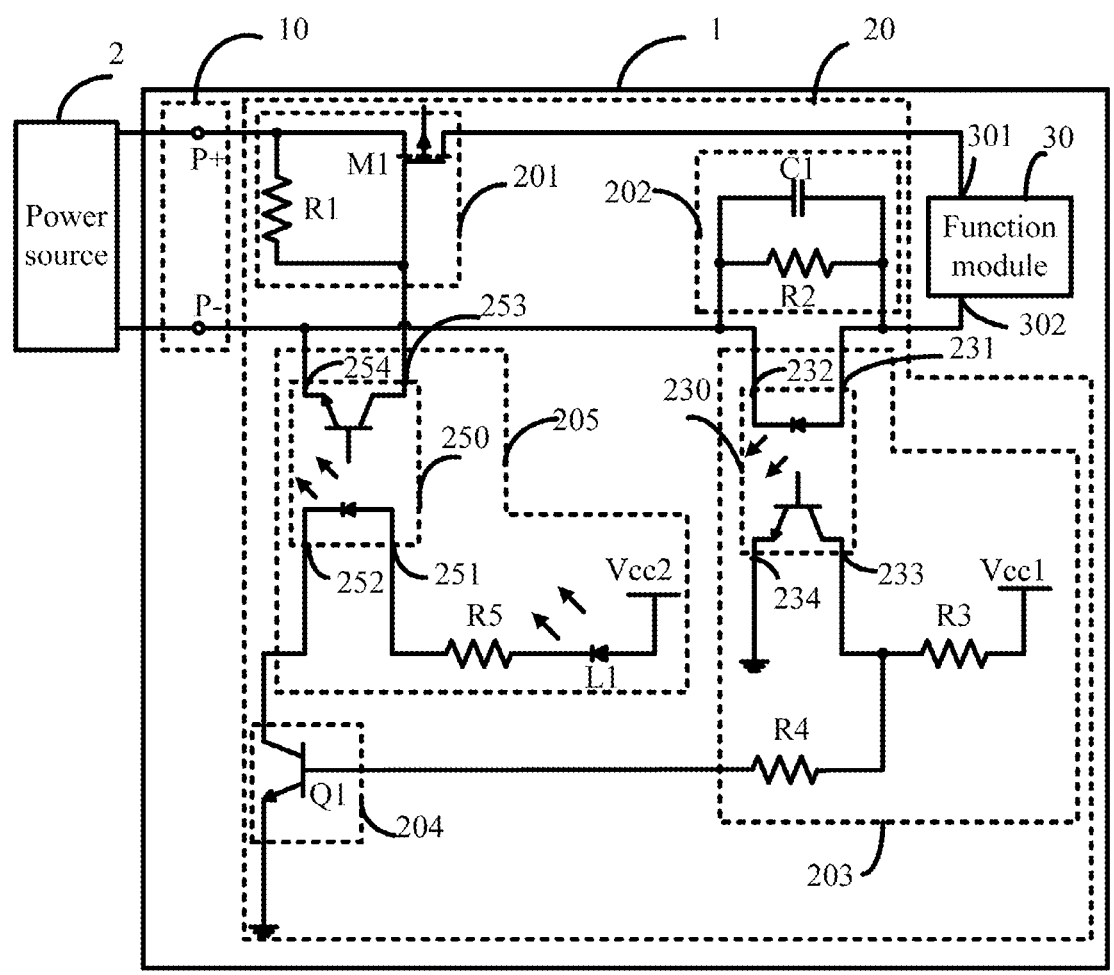
FIG. 2 is a circuit diagram of the electronic device of FIG. 1, in accordance with an exemplary embodiment.

Referring to FIG. 2, in the embodiment, the input port 10 includes an anode input terminal P+ and a cathode input terminal P−. The path switch 201 includes a PMOSFET M1 and a resistor R1. A source of the PMOSFET M1 is connected to the anode input terminal P+, a drain of the PMOSFET M1 is connected to an anode terminal 301 of the function module 30, and the resistor R1 is connected between the source and a gate of the PMOSFET M1. The current detection circuit 202 includes a detection resistor R2 connected between the cathode input terminal P− of the input port 10 and a cathode terminal 302 of the function module 30. The current flowing through the detection resistor R2 is the same as that of the function module 30.

The first control module 203 includes a first optical coupler 230, a first voltage port Vcc1, and resistors R3, R4. The first optical coupler 230 includes a first input terminal 231, a second input terminal 232, a first output terminal 233, and a second output terminal 234. The first input terminal 231 is connected to an end of the detection resistor R2 and the cathode terminal 302 of the function module 30. The second input terminal 232 is connected to the other end of the detection resistor R2, and the cathode input terminal P− of the input port 10. The first output terminal 233 is connected to the voltage port Vcc1 via the resistor R3, and the second output terminal 234 is connected to ground. The first output terminal 233 is also connected to the conductor switch 204 via the resistor R4.

In the embodiment, the conductor switch 204 is an NPN BJT Q1, the second control module 205 includes a second optical coupler 250, a voltage port Vcc2, and a resistor R5. The second optical coupler 250 includes a first input terminal 251, a second input terminal 252, a first output terminal 253, and a second output terminal 254. The first input terminal 251 is connected to the voltage port Vcc2 via the resistor R5, and the second input terminal 252 is connected to a collector of the NPN BJT Q1. The first output terminal 253 is connected to the gate of the PMOSFET M1, and the second output terminal 254 is connected to the cathode input terminal P− of the input port 10. An emitter of the NPN BJT Q1 is grounded, and a base of the NPN BJT Q1 is connected to the first output terminal 233 of the first optical coupler 230 via the resistor R4. In the embodiment, the voltage ports Vcc1 and Vcc2 are connected to a built-in battery (not shown) and at high voltage, such as 5 volts.

In the embodiment, when the voltage between the first input terminal 231 and the second input terminal 232 is equal to or greater than a predetermined voltage value, the first optical coupler 230 is turned on. In the embodiment, when the current flowing through the detection resistor R2 is equal to or greater than the predetermined current value, the voltage of the detection resistor R2 is equal to or greater than the predetermined voltage value. Namely, if the current flowing through the detection resistor R2 is equal to or greater than the predetermined current value, the first optical coupler 230 is turned on. In the embodiment, when the voltage of the first input terminal 251 is greater than that of the second input terminal 252, the second optical coupler 250 is also turned on.

When the current flowing through the detection resistor R2 is less than the predetermined current value, as described above, the first optical coupler 230 is turned off, and then a connection between the first output terminal 233 and the second output terminal 234 is cut off. The base of the NPN BJT Q1 is connected to the voltage port Vcc1 via the resistors R4 and R3 and obtains a high voltage, and then the NPN BJT Q1 is turned on accordingly. The second input terminal 252 of the second optical coupler 250 is grounded via the turned on NPN BJT Q1, because the first input terminal 251 is connected to the voltage port Vcc2 via the resistor R5, then the voltage of the first input terminal 251 is greater than that of the second input terminal 252, then the second optical coupler 250 is turned on. As is known, when the second optical coupler 250 is turned on, the first output terminal 253 is connected to the second output terminal 254, and then the gate of the PMOSFET M1 is connected to the cathode input terminal P− of the input port 10 and obtains a low voltage. Then the PMOSFET M1 is turned on accordingly, the loop between the input port 10 and the function module 30 is continued.

When the current flows through the detection resistor R2 is equal to or greater than the predetermined current value, as described above, the first optical coupler 230 is turned on. Then the base of the NPN BJT Q1 is grounded via the first optical coupler 230 which is turned on, the NPN BJT Q1 is turned off accordingly. Then the second input terminal 252 is at high voltage, the second optical coupler 250 is turned off accordingly. The base of the PMOSFET M1 is connected to the anode input terminal P+ and obtains high voltage, then the PMOSFET M1 is turned off, the loop between the input port 10 and the function module 30 is cut off. Namely, the function module 30 is stopped from being powered.

In the embodiment, the current detection circuit 202 also includes a capacitor C1. The capacitor C1 and the detection resistor R2 are connected in parallel between the cathode input terminal P− and the cathode terminal 302 of the function module 30. When the loop between the input port 10 and the function module 30 is cut off due to the current flowing through the detection resistor R2 is greater than the predetermined current value. The capacitor C1 is discharged and maintains the first optical coupler 230 to turn on for a certain duration, then maintains that the loop is cut off at the certain duration.

In the embodiment, the second control module 205 also includes a Light-emitting diode (LED) L1 which is connected between the voltage port Vcc2 and the first input terminal 251 of the second optical coupler 250. As described above, when the current flowing through the detection resistor R2 does not exceed the predetermined current value, the second optical coupler 250 is turned on. The LED L1 is turned on and emits light to indicate the current of the function module 30 is within a permissible range.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device comprising:
    a function module;
    an input port, configured for connecting to a power source and receiving power from the power source, and powering the function module using the received power, the input port comprising an anode input terminal and a cathode input terminal; and
    an over-current protection circuit comprising:
        a path switch comprising a PMOSFET and a first resistor, wherein a source of the PMOSFET is connected to the anode input terminal, a drain of the PMOSFET is connected to an anode terminal of the function module, and the first resistor is connected between the source and a gate of the PMOSFET;
        a current detection circuit, the current detection circuit and the path switch forming a loop with the input port and the function module, the current detection circuit being configured for detecting a value of a current of the loop, and producing a first control signal when detecting the current of the loop is equal to or greater than a predetermined current value, wherein, the current detection circuit comprises a detection resistor which is connected between the cathode input terminal of the input port and a cathode terminal of the function module;
        a conductor switch;
        a first control module, configured for turning off the conductor switch when receiving the first control signal, wherein, the first control module comprises a first optical coupler, a first voltage port, a second resistor, and a third resistor, the first optical coupler comprises a first input terminal, a second input terminal, a first output terminal, and a second output terminal, the first input terminal is connected to an end of the detection resistor and the cathode terminal of the function module, the second input terminal is connected to the other end of the detection resistor and the cathode input terminal of the input port; the first output terminal is connected to the first voltage port via the second resistor and the conductor switch via the third resistor, and the second output terminal is connected to ground; and
        a second control module, configured for turning off the path switch when the conductor switch is turned off, thereby cutting off the loop.

2. The electronic device according to claim 1, wherein when the current detection circuit detects that the current of the loop is less than the predetermined current value, the current detection circuit outputs a second control signal to the first control module; the first control module turns on the conductor switch when receiving the second control signal; the second control module turns on the path switch when the conductor switch is turned on, thereby continuing the connection between the input port and the function module.

3. The electronic device according to claim 1, wherein the conductor switch is an NPN BJT, the second control module comprises a second optical coupler, a second voltage port, and a fourth resistor, the second optical coupler also comprises a first input terminal, a second input terminal, a first output terminal, and a second output terminal, the first input terminal of the second optical coupler is connected to the second voltage port via the fourth resistor, the second input terminal of the second optical coupler is connected to a collector of the NPN BJT, the first output terminal of the second optical coupler is connected to the gate of the PMOSFET, the second output terminal of the second optical coupler is connected to the cathode input terminal of the input port; an emitter of the NPN BJT is grounded, a base of the NPN BJT is connected to the first output terminal of the first optical coupler via the third resistor.

4. The electronic device according to claim 3, wherein when the current flowing through the detection resistor is greater than the predetermined current value, the first optical coupler is turned on, the base of the NPN BJT is grounded via the first optical coupler which is turned on, then the NPN BJT is turned off accordingly; then the second optical coupler is turned off accordingly, then the PMOSFET is turned off due to the base of the PMOSFET is connected to the anode input terminal of the input port and obtains high voltage, then the loop between the input port and the function module is cut off.

5. The electronic device according to claim 4, wherein the current detection circuit further comprises a capacitor, the capacitor and the detection resistor are connected in parallel between the cathode input terminal of the input port and the cathode terminal of the function module; when the loop between the input port and the function module is cut off due to the current flowing through the detection resistor is greater than the predetermined current value, the capacitor is discharged and maintains the first optical coupler to turn on at certain duration, then maintain the loop is cut off at certain duration.

6. The electronic device according to claim 3, wherein when the current flowing through the detection resistor is smaller than the predetermined current value, the first optical coupler is turned off, the base of the NPN BJT is connected to the first voltage port via the third resistor and the second resistor and obtains a high voltage, then the NPN BJT is turned on accordingly, the second input terminal of the second optical coupler is grounded via the turned on NPN BJT, then the second optical coupler is turned on due to the first input terminal of it is greater than the second input terminal of it; the gate of the PMOSFET is connected to the cathode input terminal of the input port and obtains a low voltage via the second optical coupler which is turned on, then the PMOSFET is turned on and the loop between the input port and the function module is continued.

7. An over-current protection circuit, for preventing a function module from over-current, the function module obtains power from a power source via an input port, the input port comprising an anode input terminal and a cathode input terminal, the over-current protection circuit comprising:
a path switch comprising a PMOSFET and a first resistor, wherein a source of the PMOSFET is connected to the anode input terminal, a drain of the PMOSFET is connected to an anode terminal of the function module, the first resistor is connected between the source and a gate of the PMOSFET;
a current detection circuit, the current detection circuit and the path switch forming a loop with the input port and the function module, the current detection circuit being configured for detecting a value of a current of the loop, and producing a first control signal when detecting the current of the loop is equal to or greater than a predetermined current value, wherein, the current detection circuit comprises a detection resistor which is connected between the cathode input terminal of the input port and a cathode terminal of the function module;
a conductor switch;
a first control module, configured for turning off the conductor switch when receiving the first control signal, wherein, the first control module comprises a first optical coupler, a first voltage port, a second resistor, and a third resistor, the first optical coupler includes a first input terminal, a second input terminal, a first output terminal, and a second output terminal, the first input terminal is connected to an end of the detection resistor and the cathode terminal of the function module, the second input terminal is connected to the other end of the detection resistor and the cathode input terminal of the input port; the first output terminal is connected to the first voltage port via the second resistor and the conductor switch via the third resistor, the second output terminal is connected to ground; and
a second control module, configured for turning off the path switch when the conductor switch is turned off, thereby cutting off the loop.

8. The over-current protection circuit according to claim 7, wherein when the current detection circuit detects that the current of the loop is smaller than the predetermined current value, the current detection circuit outputs a second control signal to the first control module; the first control module turns on the conductor switch when receiving the second control signal; the second control module turns on the path switch when the conductor switch is turned on, thereby continuing the connection between the input port and the function module.

9. The over-current protection circuit according to claim 7, wherein the conductor switch is an NPN BJT, the second control module comprises a second optical coupler, a second voltage port, and a fourth resistor, the second optical coupler also comprises a first input terminal, a second input terminal, a first output terminal, and a second output terminal, the first input terminal of the second optical coupler is connected to the second voltage port via the fourth resistor, the second input terminal of the second optical coupler is connected to a collector of the NPN BJT, the first output terminal of the second optical coupler is connected to the gate of the PMOSFET, the second output terminal of the second optical coupler is connected to the cathode input terminal of the input port; an emitter of the NPN BJT is grounded, a base of the NPN BJT is connected to the first output terminal of the first optical coupler via the third resistor.

* * * * *